(No Model.)
E. R. BESEMFELDER.
PROCESS OF DECOMPOSING SUBSTANCES BY MEANS OF AMMONIA SALTS.
No. 543,284. Patented July 23, 1895.
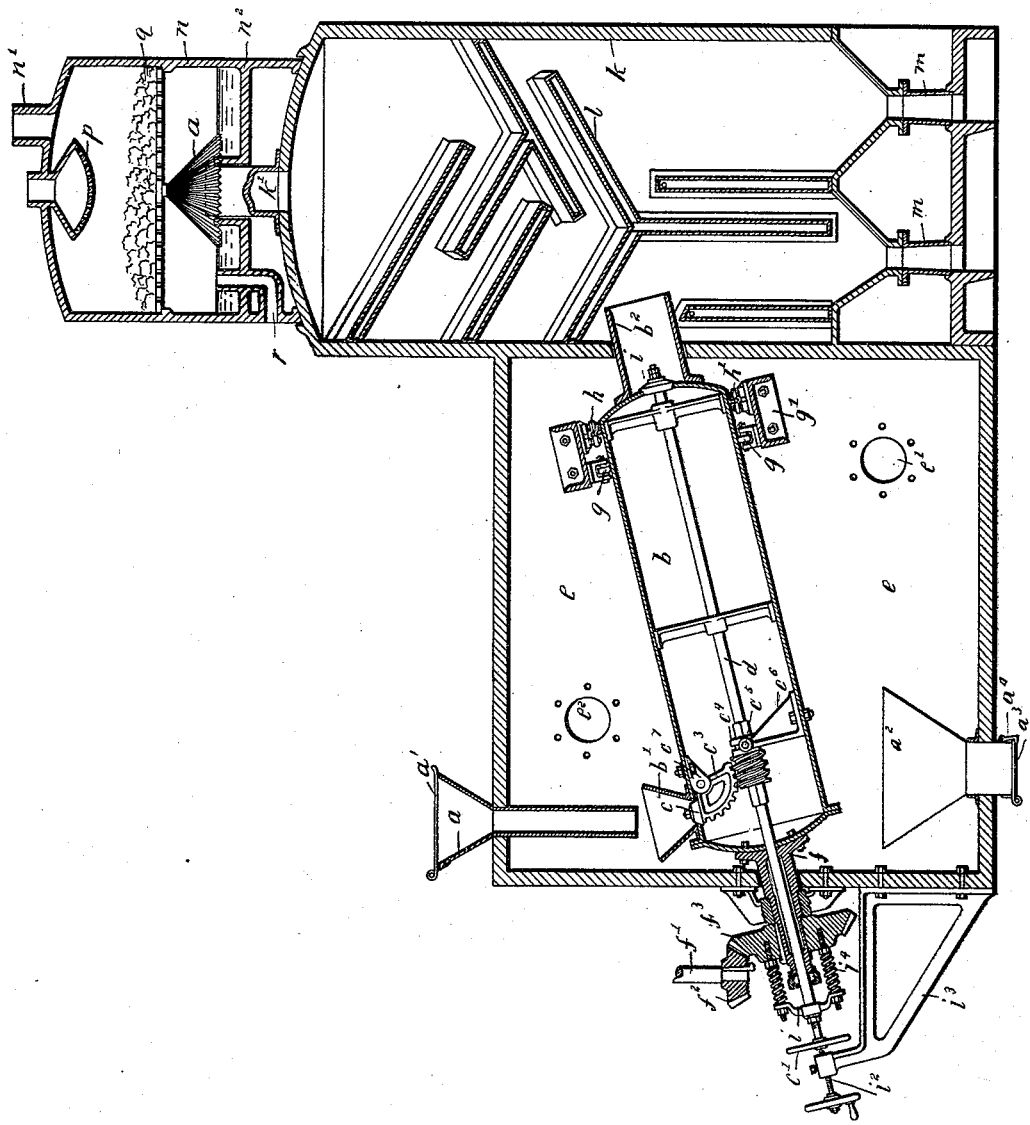
WITNESSES.
C. Sedgwick
John Lotka
INVENTOR:
E. R. Besemfelder
BY
Munn & Co
ATTORNEYS.

UNITED STATES PATENT OFFICE.

EDUARD RUDOLF BESEMFELDER, OF GROSS MOCHBERN, GERMANY.

PROCESS OF DECOMPOSING SUBSTANCES BY MEANS OF AMMONIA SALTS.

SPECIFICATION forming part of Letters Patent No. 543,284, dated July 23, 1895.

Application filed December 27, 1893. Serial No. 494,885. (No specimens.)

*To all whom it may concern:*

Be it known that I, EDUARD RUDOLF BESEMFELDER, doctor of philosophy, chemist, of 88 Tauentzienstrasse, Gross Mochbern, near Breslau, Silesia, in the Kingdom of Prussia and German Empire, have invented a Process for Decomposing and Separating Substances from Allied Foreign Matter by Means of Ammonia Salts, of which the following is a specification.

This invention relates to a method of or process for the separation of metals from ores and other insoluble materials in combination or mixture therewith, and is especially applicable in the utilization of certain waste materials, such as the strontian residues from the desaccharization of molasses, the process being continuous and permitting the recovery and re-employment of the reagents employed.

The new process consists in treating the compound material at the critical pressure and temperature with a decomposing material, and particularly with ammonium chloride in a dry state. The superfluous reagents, together with the volatile products, are separated by distillation or sublimation from the non-volatile residue and from this the soluble part is separated by a solvent.

In carrying out the process practically the dry and preferably pulverized material is mixed with a suitable quantity of ammonium chloride, to be determined in each case, in rather more than molecular proportions, and the mixture is introduced into a vessel in which it can be subjected to pressure and heat. During the process the mixture is agitated, which may be effected by rotation or suitable movement of the vessel. The pressure and the heat may vary within certain limits, the condition being that the heat employed is sufficient for the dissociation of the ammonium chloride or other dissociation compound at the pressure used. This being so the components parts of the mixture are subject to the action of the liberated hydrochloric acid and of ammonium gas under pressure. After having been treated thus for a sufficient time the volatile constituents or contents of the vessel are distilled or sublimed and condensed in a suitable receiver. The residue is treated with a convenient solvent, such as water, for the separation of the soluble portions therefrom. The total matters from the vessel are thus separated into volatile, soluble, and insoluble parts, each of which may be treated and purified as desired by known means.

The ammonia contained in the sublimate or distillate can be reconverted into ammonium chloride by combination with the hydrochloric acid arising from the decomposition of the chlorides produced by the process, so that there need be no loss of acid or base, the procedure being similar to that adopted in the soda-ammonia process.

In carrying out my invention I may employ an apparatus such as shown in the accompanying drawing, which is a longitudinal section thereof.

The apparatus consists of a casing $e$, provided with a hopper $a$ for introducing the mixture of ammonia salt with the substance or compound to be treated. The hopper $a$ may be closed by means of a lid $a'$. Below the hopper is arranged a revoluble inclined cylindrical vessel or drum $b$. The vessel is provided with a manhole and an inlet-hopper $b'$ leading to the same, the said hopper being adapted to come beneath the feed-hopper $a$ or over the discharge-hopper $a^2$, according to the position of the vessel. The discharge-hopper may be provided with a hinged bottom $a^3$ and a catch $a^4$ to hold the same closed. Through the vessel $b$ extends centrally a shaft $d$, capable of being turned independently of the vessel by means of a hand-wheel $c'$. The shaft is also capable of longitudinal movement within the vessel through the medium of a screw $i^2$ passing through a bracket $i^3$ and abutting against the lower end of the shaft. The upper end of the shaft carries a valve $i$, adapted to close an opening in the upper head of the drum, which opening leads into a tubular-extension $b^2$, whose upper end is located within a condenser $k$. The drum $b$ is supported and guided at its upper end by means of rollers $g$, journaled in stationary brackets $g'$, and the upper head of the vessel is provided with an annular flange $h$, adapted to be engaged on both sides by rollers $h'$, which are likewise journaled in the brackets $g'$, said rollers serving to prevent longitudinal movement of the vessel. The lower end of the vessel is supported by means of a sleeve $f$, journaled in the casing $e$, and carrying a bevel-wheel $f^3$, which is in engagement with another bevel-wheel $f^2$ mounted on the drive-shaft $f'$. On the shaft $d$ is secured an arm $i'$, actuated by springs $i^4$ interposed between it and the bevel-wheel $f^2$, the springs being adapted to keep the valve $i$ closed. On the shaft $d$ is further mounted a worm $c^2$, held to rotate with the shaft, but capable of sliding thereon, the worm being provided with a grooved collar $c^4$ adapted to be engaged by a pin $c^5$ projecting from a bracket $c^6$, which is secured to the vessel for the purpose of preventing longitudinal movement of the worm $c^2$ relatively to the vessel. The worm $c^2$ meshes with a toothed sector $c^3$ pivoted to a bracket $c^7$, extending from the inner surface of the vessel, the said sector carrying a valve $c$ adapted to close the manhole over which is located the hopper $b'$. It will be obvious that the valve $c$ is operated by turning the hand-wheel $c'$, and the valve $i$ by turning the hand-wheel on the screw $i^2$. The casing $e$ is provided with an opening $e'$ for the admission of a heating agent, such as combustion-gases from a furnace, and $e^2$ is the outlet-opening for the said gases.

The condenser $k$ is provided with a series of hollow partitions or baffle-boards $l$ through which a cooling agent may be circulated. Some of the partitions, as shown, are formed with oppositely-inclined portions to form gutters where they meet, the gutters being likewise inclined. Discharge-tubes $m$ are located at the bottom of the condenser. By means of a tube $k'$ the top of the condenser communicates with an absorption-tower $n$ provided with an annular receptacle $n^2$, in which collects the acid discharged in the form of a spray by a spout $p$ located in the upper part of the absorption-tower. A filter $q$ is interposed between the spout $p$ and the receptacle $n^2$. Above the upper end of the pipe $k'$ is arranged a bell-shaped or cone-shaped collector $o$, in which the gases passing up through the said pipe accumulate, the lower edge of the said collector being preferably indented or serrated, as shown, and extending below the level of the liquid in the receptacle $n^2$, said level being controlled by the overflow-pipe $r$. Any gaseous products which may remain at the end of the operation escape through the pipe $n'$ arranged in the top of the absorption-tower.

I will now describe the application of my invention to the decomposition of strontian residues resulting from the desaccharization of molasses, also the application of the improved process to the separation of nickel from its ore.

(A.) In a practical trial of the invention I treated strontian residues of the following composition: oxide of strontian, 45.33 per cent.; oxide of calcium, 19.90 per cent.; alkalies, .37 per cent.; oxides of iron and aluminium, 7.85 per cent.; silicic acid, 7.86 per cent.; sulphuric acid, 10.77 per cent.; carbonic acid, 7.80 per cent. One part of the above residue was thoroughly mixed in a dry and pulverized condition with two parts of dry sal-ammoniac. The mixture was introduced into the drum $b$ through the hoppers $a$ and $b'$ and the valve $c$ closed thereupon by turning the hand-wheel $c'$. A slow rotation was then imparted to the drum by means of the shaft $f'$ and wheels $f^2$ and $f^3$. At the same time a heating agent was admitted at $e'$, so as to produce within the drum a temperature of about 350° centigrade and a pressure of about three to six atmospheres, the pressure being due to the gaseous products of dissociation. These gases or vapors act on all the particles of the residue as the latter is continually agitated by the rotation of the drum. The carbonates, sulphates, silicates, ferrates, and aluminates of strontium and calcium, by exchanging their constituents with those of the chloride of ammonium, form chlorides of strontium and calcium, and carbonates, sulphates, silicates, ferrates, and aluminates of ammonium. The volatile products consist principally of unaltered sal-ammoniac, carbonate of ammonia, small quantities of ammonia sulphide, sulphite, and sulphate, and other volatile compounds of ammonia. After the heating has been carried on for about one hour the operation is terminated, and the valve $i$, which also serves as a safety or pressure-controlling valve, is opened by turning the hand-wheel secured to the screw $i^2$. The above-enumerated volatile products escape through the tubular extension $b^2$ into the condensing or sublimating chamber $k$, where they are sublimated, while the free ammonia passes up through the pipe $k'$ into the absorption-tower $n$ and is taken up by the hydrochloric acid discharged from the spout $p$ and collected in the receptacle $n^2$. The sublimate which forms itself in the chamber $k$ is slightly moistened and mixed with coal-dust and crystallized chloride of magnesium. This mixture is again sublimated at a moderately-high temperature, whereby all the ammonia contained therein is caused to combine with chlorine to form sal-ammoniac. The greater part of chloride of iron and of chloride of aluminium remains as a residue consisting of an oxide or a basic chloride. Thus it will be seen that the sal-ammoniac regenerated in the above manner contains but little iron, and the slight quantity contained therein does not prevent the use of the sal-ammoniac for the decomposition of further quantities of strontian residues according to my improved process. The non-volatile residue remaining in the drum $b$ is treated with water, whereby an almost absolutely-pure solution of chloride of calcium and chloride of magnesium is obtained. This solution contains about eighty per cent. of the entire amount of strontian present in the residue treated. This solution by the application of heat and an electric current is decomposed into hydrates of strontium and of calcium and chlorine. Since calcium hydrate is but slightly soluble in warm water, a saturated and very pure solution of hydrate of strontium is obtained, from which by cooling and crystallization is obtained a salt called "white salt," (in German "weisses salz,") which is largely employed in the desaccharization of molasses. The solution adhering to the crystals and containing traces of chlorides may be removed by centrifugal force in a suitable apparatus. The solution is used over and over again for washing the residues from the drum $b$ till sufficient quantities of chlorides and salts of chloric acid are dissolved in the said solution. The solution is then concentrated by boiling it, and the residue is strongly heated, whereby chlorine and oxides of the metals contained in the residue are obtained. The chlorides which have not been decomposed are dissolved and their solution is subjected to electrolysis. Since about eighty per cent. of the strontium contained in the residue found in the drum $b$ is dissolved in the above manner, it is not necessary to subject to further treatment the residue left at the end of the washing or dissolving operation. The gases and vapors which are not condensed or sublimated in the chamber $k$ and pass up into the absorption-tower $n$ are brought into intimate contact with the hydrochloric acid issuing from the spout $p$ and filter $q$. As the serrated edge of the collector $o$ dips into the acid contained in the receptacle $n^3$, it will be obvious that all the said gases must pass through the acid. The latter in this manner becomes saturated with ammonia and is discharged through the overflow-pipe $r$. The same liquid may be passed several times through the absorption-tower, in order to obtain a better saturation. The waste gases escape through the pipe $n'$.

(B.) I also subjected to treatment according to my invention a nickel ore of the following composition: nickel, 5.0 per cent.; manganese, .4 per cent.; iron, 6.4 per cent.; gangue, 88.2 per cent. This ore, pulverized and mixed with sal-ammoniac, as described with reference to the treatment of strontian residues, was introduced into the drum $b$ and subjected to pressure and heat, as before described. The silicate of nickel contained in the ore is thereby decomposed, and with the constituents of sal-ammoniac forms chloride of nickel and silicate of ammonia. The volatile products, which consist mainly of unaltered sal-ammoniac and other ammonia compounds, are treated as before described. The non-volatile residue left in the boiler is removed through the hoppers $b'$ and $a^2$ and washed with water, whereby a solution of nickel chloride is obtained which contains fifty per cent. of the nickel present in the residue. If the residue is properly treated, this solution is free from iron. The small quantity of manganese which has been dissolved combines by contact with the oxygen of the air to form a hydrate of manganous-manganic oxide, ($Mn_3O_4$.) The metallic nickel is obtained from the solution by electrolysis or by heating it in a current of hydrogen or other gas (such as, for instance, carbureted hydrogen) having reducing properties. The residue left after the washing contains fifty per cent. of the nickel and gangue.

By repeating the above-described treatment more than fifty per cent. of the nickel may be recovered.

I claim—

The herein-described method of extracting metals in the form of chlorides from ores and other materials, which consists in exposing the said materials, in an air-tight tank and in the presence of sal ammoniac, to a sufficient degree of heat to produce dissociated vapors of the said sal ammoniac and thus allow the free ammonia contained in the said vapors to act upon the materials and combine with the foreign matter allied to the metal or metals to be extracted, while the chlorine combines with the said metal or metals, substantially as described.

In witness whereof I have hereunto set my hand in presence of two witnesses.

EDUARD RUDOLF BESEMFELDER.

Witnesses:
 FRITZ HUEDSCHINSKY,
 PAUL BITTNER.